United States Patent
Juergensen

(10) Patent No.: US 8,504,312 B2
(45) Date of Patent: Aug. 6, 2013

(54) APPARATUS AND METHOD FOR COMPARING GAS PRESSURE MEASUREMENTS

(76) Inventor: Kevin W. Juergensen, Addison, PA (US)

( * ) Notice: Subject to any disclaimer, the term of this patent is extended or adjusted under 35 U.S.C. 154(b) by 667 days.

(21) Appl. No.: 12/603,543

(22) Filed: Oct. 21, 2009

(65) Prior Publication Data

US 2010/0100339 A1    Apr. 22, 2010

Related U.S. Application Data

(60) Provisional application No. 61/196,982, filed on Oct. 21, 2008.

(51) Int. Cl.
*G01F 17/00* (2006.01)

(52) U.S. Cl.
USPC .............. 702/50; 702/24; 702/98; 702/182; 702/189

(58) Field of Classification Search
USPC .............. 702/24, 50, 98, 104, 138, 182, 189; 128/201.28, 204.26, 205.11, 205.12; 116/266
See application file for complete search history.

(56) References Cited

U.S. PATENT DOCUMENTS

| | | | | |
|---|---|---|---|---|
| 6,526,971 B2* | 3/2003 | Kellon | ............ | 128/204.28 |
| 6,817,359 B2* | 11/2004 | Deas et al. | ............ | 128/201.27 |
| 7,520,280 B2* | 4/2009 | Gordon | ............ | 128/205.28 |

* cited by examiner

*Primary Examiner* — Elias Desta

(57) ABSTRACT

A singular sealed apparatus and method suitable for confirming pressure measurements in a rebreather prior to use of the rebreather. The singular sealed apparatus may have a canister lid, gas sensors and a processor, all from a rebreather, as well as a pressure sensor, an input device, a processor, an indicator and a pod with a pressure measurement outlet, a gas supply inlet, a relief valve and a gas exit valve. Alternatively, the singular sealed apparatus may have a gas sensor from a rebreather and an analyzer, a pressure sensor, an input device, a processor, an indicator, a lid and a pod with a pressure measurement outlet, a gas supply inlet, a relief valve and a gas exit valve. The inventive method is characterized by assembling the singular sealed apparatus, inputting a concentration of a gas present in a gas mixture, admitting the gas mixture into the singular sealed apparatus, expelling ambient gas present in the singular sealed apparatus, measuring absolute pressure of the gas mixture, calculating partial pressure of the gas, indicating the calculated partial pressure of the gas, measuring partial pressure of the gas, indicating the measured partial pressure of the gas and comparing the calculated partial pressure of the gas to the measured partial pressure of the gas.

15 Claims, 7 Drawing Sheets

Pod 200

APPARATUS AND METHOD FOR COMPARING GAS PRESSURE MEASUREMENTS

CROSS-REFERENCE TO RELATED APPLICATIONS

The present application claims the benefit of Provisional Application No. 61/196,982 filed Oct. 21, 2008, which is incorporated herein by reference.

BACKGROUND

1. Field of the Invention

The present invention relates generally to enhancing safety in the use of breathing systems.

2. Background Discussion

Conventional breathing systems, such as systems used for underwater diving situations, mining, firefighting or outer space, typically provide a gas supply system to a user who is underwater, or in another oxygen-depleted or toxic gas environment. These systems are typically portable and are adapted to provide sustained usable air for breathing for an estimated period of time.

Examples include AQUA-LUNG® or SCUBA (Self Contained Underwater Breathing Apparatus), which is used by free divers and, in similar fashion, by fire fighters in many hazardous situations. Typically, a SCUBA-type apparatus employs a relatively large tank containing a compressed gas mixture and a mouthpiece or face mask connected to the tank through a flow regulator. The gas mixture commonly consists of two or more constituent gases, such as oxygen and one or more inert gases such as nitrogen. A user inhales from the tank and exhales into the ambient atmosphere.

Another type of apparatus, a rebreathing apparatus, has been developed to recycle gases exhaled by a user to remove carbon dioxide therefrom with a "scrubber" and then recycle the unmetabolized oxygen. Oxygen or an oxygen-enriched gas mixture is injected into the "scrubbed" gas from a supply source to maintain the partial pressure of oxygen in the gas mixture at a desired level, and then the gas mixture is passed back to the user for rebreathing. Rebreathers can therefore extend the amount of time the breathing device can be used by lowering the rate of consumption of the gas mixture.

Pure oxygen is often utilized in rebreathers, introducing the problem of hyperoxia, which is excess oxygen in body tissues caused by breathing oxygen at elevated partial pressures or oxygen-rich gases at normal atmospheric pressure for a prolonged period of time. Hyperoxia can cause cell damage in the central nervous system and the lungs of a user.

Early rebreather systems were relegated to use by professionals in unsafe environmental conditions, such as diving or firefighting, due to the complexity and costs of the systems as well as the extensive training required for the use of these systems. These systems exhibited an undesirable level of control over partial pressure of oxygen ($PP_{oxygen}$) in the gas mixture present in the rebreather system, potentially resulting in a user experiencing hyperoxia or hypoxia, which is oxygen deprivation capable of causing loss of consciousness, seizures, coma, priapism or death. An increase or decrease in $PP_{oxygen}$ in a rebreather can result in a hyperoxic or hypoxic gas detrimental to the rebreather user.

Because of the dangers posed by hyperoxia and hypoxia, it is essential for the diver to monitor and have accurate data for $PP_{oxygen}$ for the duration of a dive. Currently-available rebreather systems incorporate sensors, processors and indicators to detect, measure, control and display $PP_{oxygen}$ continuously during a dive. However, the sensors used in these systems, while improved over early rebreather systems, are still prone to malfunctions, rendering the systems less reliable than desired for maintaining target oxygen levels. Often, the problem of malfunctioning sensors is not resolved even by incorporating redundant sensors in the rebreather and utilizing a protocol implemented by the processor to identify whether one or more of the sensors is not operating correctly.

Methods and protocols known in the art are directed to monitoring oxygen levels during a dive. For the foregoing reasons, there is a need for an apparatus and method that may be used by a diver prior to undertaking a dive in order to confirm proper functioning of the rebreather sensors and processor.

SUMMARY

Using a singular sealed apparatus and method of the present invention, it is advantageous to perform a pre-dive safety check of the sensors and processor in a rebreather by measuring the partial pressure of oxygen or another selected gas in a gas mixture of known composition using at least one rebreather sensor, while at the same time independently measuring absolute gas pressure, which is the total pressure of the gas mixture in the singular sealed apparatus, and calculating the partial pressure of the selected as a product of absolute gas pressure and the concentration of the gas in the gas mixture. In other words, $PP_{gas}$=(absolute gas pressure)×(% gas concentration), where % gas concentration in the gas mixture is known and absolute gas pressure and $PP_{gas}$ are expressed in any suitable units.

This pre-dive safety check provides the advantage of determining $PP_{oxygen}$ independent of the rebreather sensor, eliminating a potential source of error. The $PP_{oxygen}$ value calculated using the singular sealed apparatus and method of the present invention may be compared with the $PP_{oxygen}$ value measured by the rebreather sensor and processor. A difference between the calculated $PP_{oxygen}$ value and the measured $PP_{oxygen}$ value indicates that the rebreather sensor or the rebreather processor is not operating properly and must be serviced or replaced before use during a dive.

Accordingly, an object of this invention is a singular sealed apparatus suitable for comparing gas pressure measurements in a rebreather. The singular sealed apparatus comprises a rebreather canister lid, a rebreather processor, a rebreather sensor, a rebreather indicator, a rebreather hole formed in the rebreather canister lid, a pod, a relief valve, a gas supply inlet, a pressure measurement outlet, a gas exit valve, a plug, a pressure sensor, a processor, an indicator and an input device. In some embodiments, the apparatus further comprises an interface that comprises the pressure sensor, processor, indicator and input device.

The rebreather processor is adapted to receive measurement signals corresponding to partial pressure of a gas in a gas mixture present in the apparatus and to transmit measurement data for concentration or partial pressure of the gas.

The rebreather sensor is attached to a surface of the rebreather canister lid that is exposed to the gas mixture present in the apparatus. The rebreather sensor has a connection with the rebreather processor for transmitting signals and is adapted to produce measurement signals corresponding to concentration or partial pressure of the gas in the gas mixture present in the apparatus and to transmit the measurement signals to the rebreather processor.

The rebreather indicator has a connection with the rebreather processor for receiving measurement data and is adapted to receive and indicate measurement data for concentration or partial pressure of the gas in the gas mixture present in the apparatus.

The rebreather hole is formed in the rebreather canister lid. In some embodiments, the rebreather hole is adapted to removably receive a hose.

The pod is adapted to be removably attached to the rebreather canister lid.

In some embodiments, the apparatus further comprises a fastener adapted to removably secure the pod to the rebreather canister lid.

The relief valve, gas supply inlet, gas pressure regulator, pressure measurement outlet and gas exit valve are integrated into the pod. The relief valve limits absolute gas pressure in the apparatus.

The plug is adapted to removably fill the rebreather hole.

In some embodiments, the pressure sensor is adapted to be removably connected to the pressure measurement outlet.

In some embodiments, the interface is adapted to be removably connected to the pressure measurement outlet. In some embodiments, the interface comprises a pressure sensor adapted to measure absolute gas pressure in the apparatus and transmit absolute pressure measurement signals.

In some embodiments, the interface further comprises an input device adapted to permit a user to input a concentration of a gas in a gas mixture present in the apparatus and to transmit data corresponding to the concentration of the gas in the gas mixture.

In some embodiments, the interface further comprises a processor adapted to receive absolute pressure measurement signals from the pressure sensor, receive data for concentration of the gas present in the apparatus from the input device, calculate partial pressure of a gas in a gas mixture present in the apparatus as a product of absolute gas pressure and the concentration of the gas in the gas mixture, and transmit data corresponding to absolute gas pressure and partial pressure of the gas in the gas mixture.

In some embodiments, the interface further comprises an indicator adapted to receive data from the processor and indicate absolute gas pressure and partial pressure of the gas in the gas mixture.

In some embodiments, the pressure sensor, input device, processor and indicator have connections adapted for transmitting and receiving data and signals.

Another object of this invention is a method suitable for comparing gas pressure measurements in a singular sealed apparatus. The method comprises removably attaching the rebreather canister lid to the pod; removably filling the rebreather hole with the plug; opening the gas exit valve; inputting a concentration of a gas using the input device; admitting a gas mixture comprising the gas into the gas supply inlet; closing the gas exit valve; measuring absolute pressure of the gas mixture using the pressure sensor; calculating partial pressure of the gas using the processor; indicating partial pressure of the gas using the indicator; measuring partial pressure of the gas using the rebreather sensor and rebreather processor; indicating partial pressure of the gas using the rebreather indicator; and comparing partial pressure of the gas as indicated by the rebreather indicator to partial pressure of the gas as indicated by the indicator. One of ordinary skill in the art will recognize that the initial addition of the gas mixture will expel the ambient atmosphere present in the singular sealed apparatus, and the gas exit valve may be closed once the singular sealed apparatus contains only the gas mixture.

In some embodiments, the method further comprises removably attaching the pressure sensor to the pressure measurement outlet;

In some embodiments, the method further comprises removably attaching the interface to the pressure measurement outlet.

Although very narrow claims are presented herein, it should be recognized that the scope of this invention is much broader than presented by the claim. It is intended that broader claims will be submitted in an application that claims the benefit of priority from this application.

BRIEF DESCRIPTION OF THE DRAWINGS

These and other features, aspects and advantages of the present invention will become better understood with regard to the following description, appended claims and accompanying drawings where:

DESCRIPTION

Figure 1:
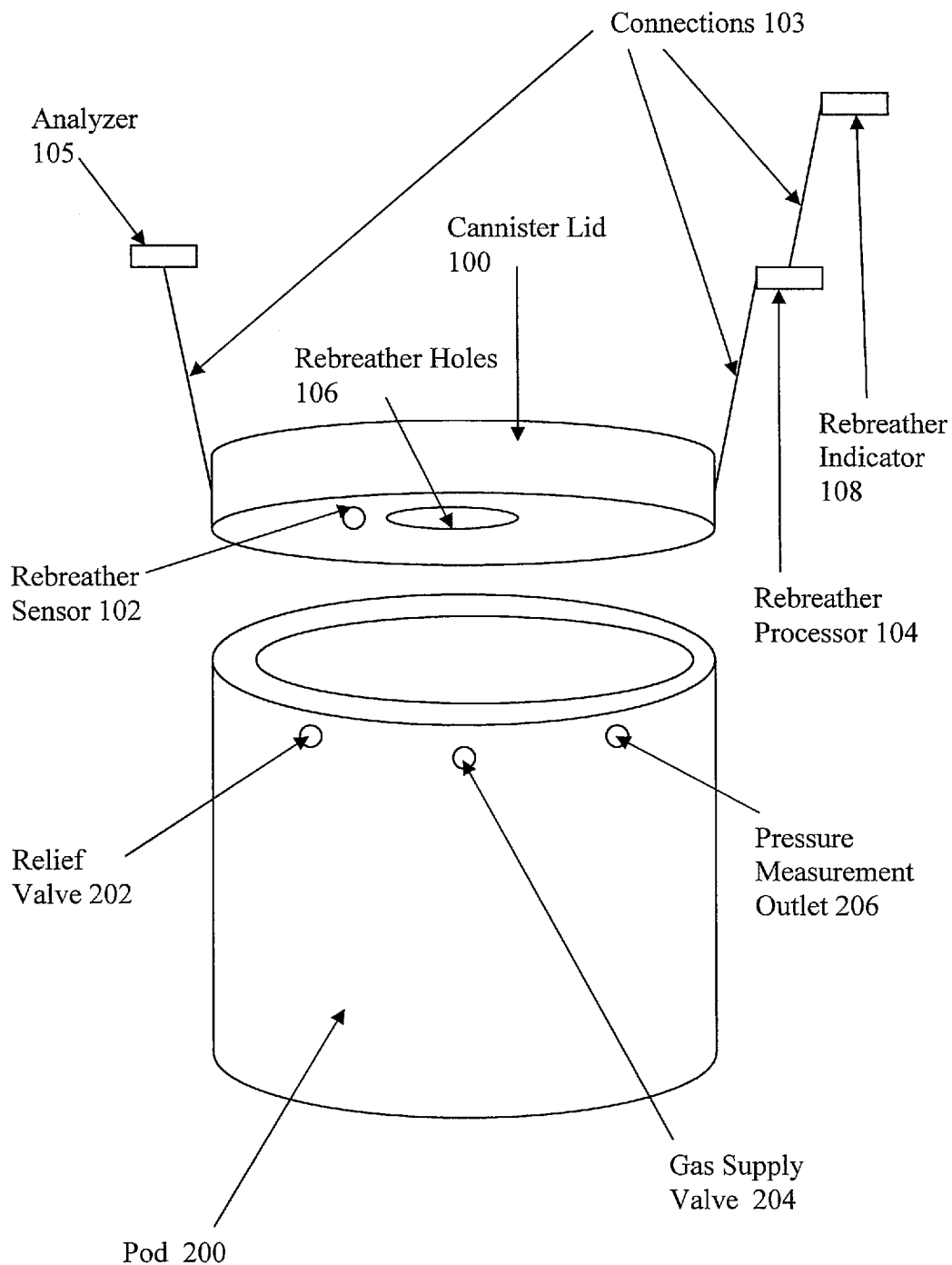
FIG. 1 shows a front perspective view of an apparatus embodying features of the present invention.

A rebreather comprises a rebreather scrubber canister, which comprises a rebreather canister lid 100 and a rebreather canister body. A rebreather further comprises at least one rebreather sensor 102, a rebreather processor 104 for receiving signals from the rebreather sensor 102 and for transmitting data, including absolute gas pressure of a gas mixture present in the rebreather and partial pressure of a selected gas in the gas mixture, and a rebreather indicator 108 for receiving and displaying data from the rebreather processor. Many commercially-available rebreathers incorporate as many as three rebreather sensors 102. In common dive practice, the rebreather sensor 102, rebreather processor 104 and rebreather indicator 108 are used by a diver to measure, control and indicate $PP_{oxygen}$ continuously during a dive.

In some embodiments, the gas mixture comprises a single gas. In some embodiments, the selected gas is oxygen.

The rebreather sensor 102 is customarily attached to the rebreather canister lid 100, and connections 103 are provided between the rebreather sensor 102 and rebreather processor 104 and between the rebreather processor 104 and rebreather indicator 108 for transmitting and receiving data and signals. The rebreather sensor 102 is attached to a surface of the rebreather canister lid 100 that is exposed to the gas mixture present in the rebreather.

One or more rebreather holes 106 typically are present in the rebreather canister lid 100. In some embodiments, the rebreather holes 106 have shapes and configurations adapted to removably receive one or more hoses through which gases move into or out of the rebreather scrubber canister.

In some embodiments, the rebreather processor 104 applies a selection protocol to the signals from the rebreather sensor 102.

Figure 2:
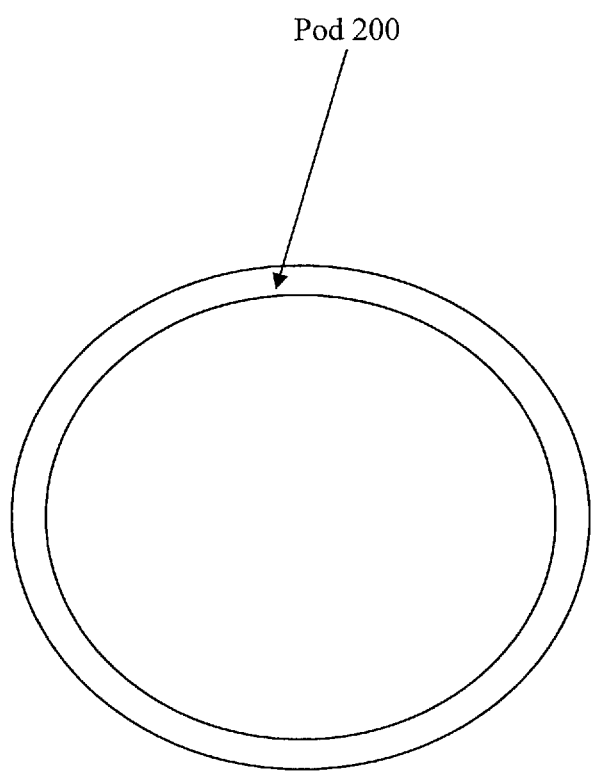
FIG. 2 shows a sectional view of an apparatus embodying features of the present invention.

As shown in FIGS. 1 and 2, the present invention provides a pod 200. In some embodiments, the pod 200 is cylindrical with an annular cross-section, closed on one end and open on the opposite end. In some embodiments, the pod 200 incorporates an o-ring or other seal around the periphery of the open end. In some embodiments, the pod 200 is constructed from any plastic, metal or other material providing suitable rigidity and impermeability to gases at pressures of approximately 30 pounds per square inch, or psi. In some embodiments, the pod 200 is constructed from aluminum alloy.

In some embodiments, the pod 200 is adapted to be removably attached to the rebreather canister lid 100, such that different embodiments or models of the pod 200 may be distinctly adapted to mate with different rebreather canister lid 100 of various commercially-available rebreathers having different shapes and configurations. In some embodiments, the singular sealed apparatus includes a fastener adapted to removably secure the pod 200 to the rebreather canister lid 100.

In some embodiments, a relief valve 202 is integrated into the pod 200 to limit absolute gas pressure in the singular sealed apparatus apparatus and thereby protect structural integrity of the singular sealed apparatus and the rebreather sensor 102. The relief valve 202 operates by allowing gas present in the singular sealed apparatus to escape when the absolute gas pressure in the singular sealed apparatus exceeds a preset level. The absolute gas pressure in the singular sealed apparatus preferably is kept at 30 psi or less. Suitable relief valves are commercially-available from, for example, Swagelok®.

In some embodiments, a gas supply inlet 204 is integrated into the pod 200 to permit addition of a gas mixture into the singular sealed apparatus, usually from a pressurized tank. In some embodiments, a gas pressure regulator is integrated into the gas supply inlet 204. Gas mixtures are commonly supplied from tanks pressurized to 140 psi, which, in some embodiments, exceeds the operating limit of the singular sealed apparatus. The gas pressure regulator reduces the pressure of the gas mixture at the gas supply inlet 204 to 30 psi, which is within the operating limit of the apparatus. Suitable gas pressure regulators are commercially-available from, for example, Victor® Manufacturing.

In some embodiments, a pressure measurement outlet 206 is integrated into the pod 200. The pressure measurement outlet 206 is adapted to permit sampling of the gas present in the singular sealed apparatus to measure absolute gas pressure.

In some embodiments, a gas exit valve 207 is integrated into the pod 200. The gas exit valve 207 is adapted to permit expulsion of gas present in the singular sealed apparatus and to be opened or closed, such as a needle valve. The gas exit valve 207 may include a one-way check valve to permit only outflow of gas from the singular sealed apparatus.

In some embodiments, the present invention comprises a pressure sensor, a processor, an input device and an indicator. In some embodiments, the pressure sensor is adapted to measure absolute gas pressure in the singular sealed apparatus and transmit absolute gas pressure measurement signals.

In some embodiments, the input device is adapted to permit a user to input a known concentration of a gas present in the singular sealed apparatus and to transmit data for concentration of the gas present in the singular sealed apparatus.

In some embodiments, the processor is a general purpose computer adapted to receive absolute gas pressure measurement signals from the pressure sensor, receive data corresponding to the concentration of a gas in a gas mixture present in the singular sealed apparatus from the input device, calculate the partial pressure of the gas in the gas mixture present in the singular sealed apparatus and transmit data corresponding to absolute gas pressure and partial pressure of the gas in the gas mixture to the indicator.

In some embodiments, the indicator is adapted to receive data from the processor and indicate absolute gas pressure and the partial pressure of the gas in the gas mixture present in the singular sealed apparatus. In some embodiments, the indicator may incorporate a liquid crystal display screen or other suitable visual indicating mechanism to display data.

In some embodiments, the pressure sensor, input device, processor and indicator have connections adapted for transmitting and receiving data and signals.

In some embodiments, the present invention comprises an interface 208. In some embodiments, the interface 208 comprises the pressure sensor, input device, processor and indicator.

Figure 3:
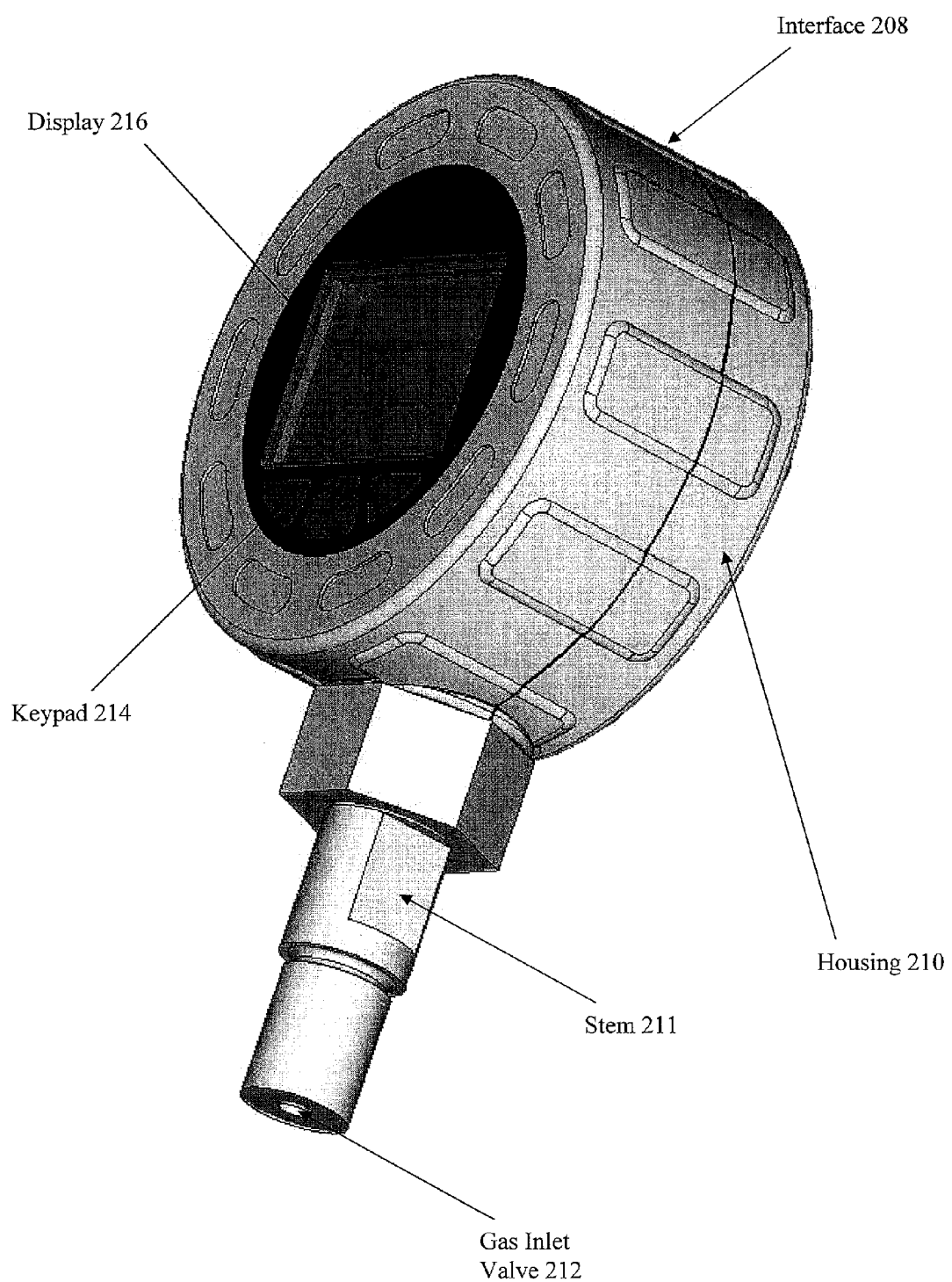
FIG. 3 shows a perspective view of an apparatus embodying features of the present invention.
Figure 6:
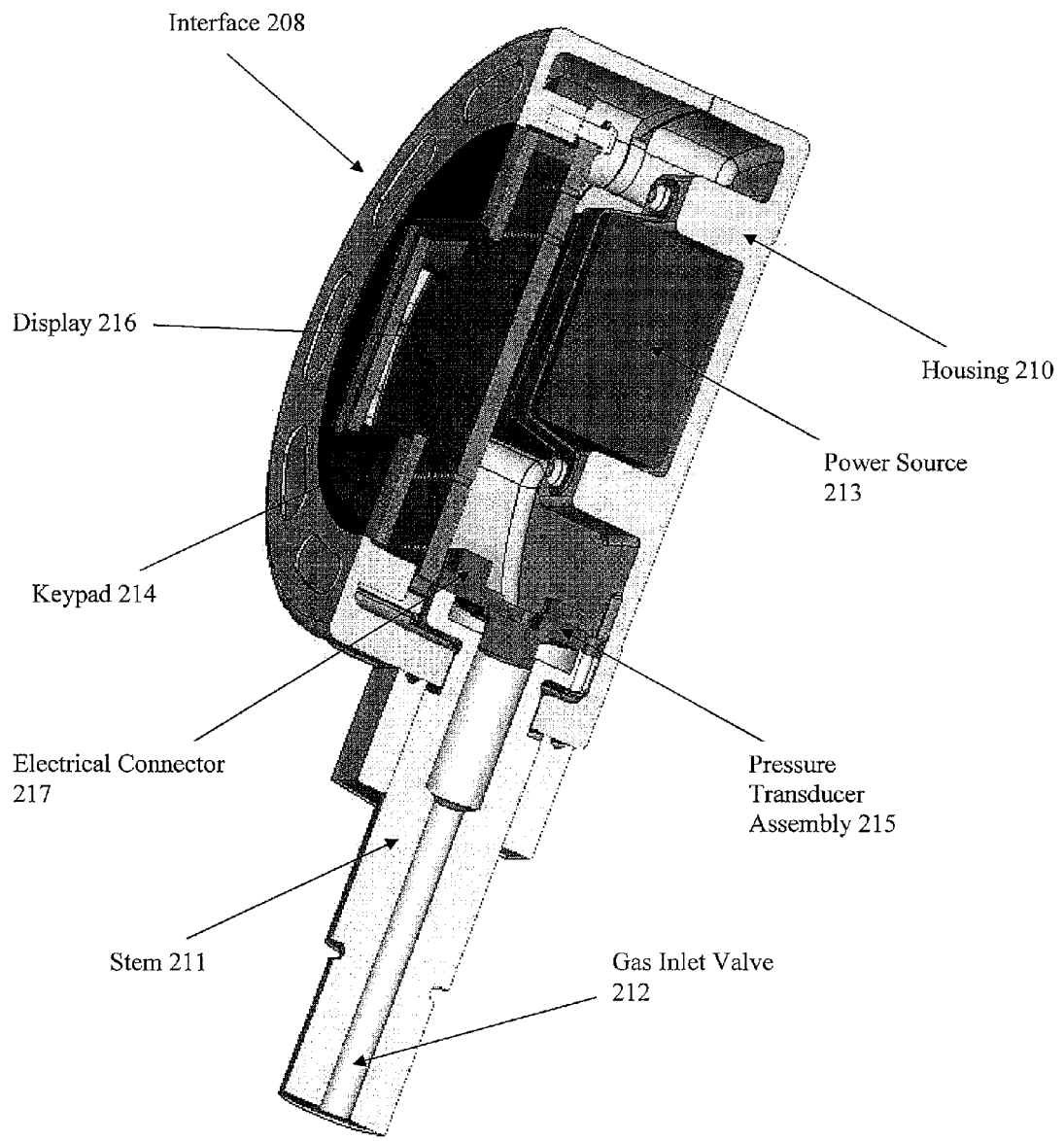
FIG. 6 shows a sectional view of an apparatus embodying features of the present invention.
Figure 7:
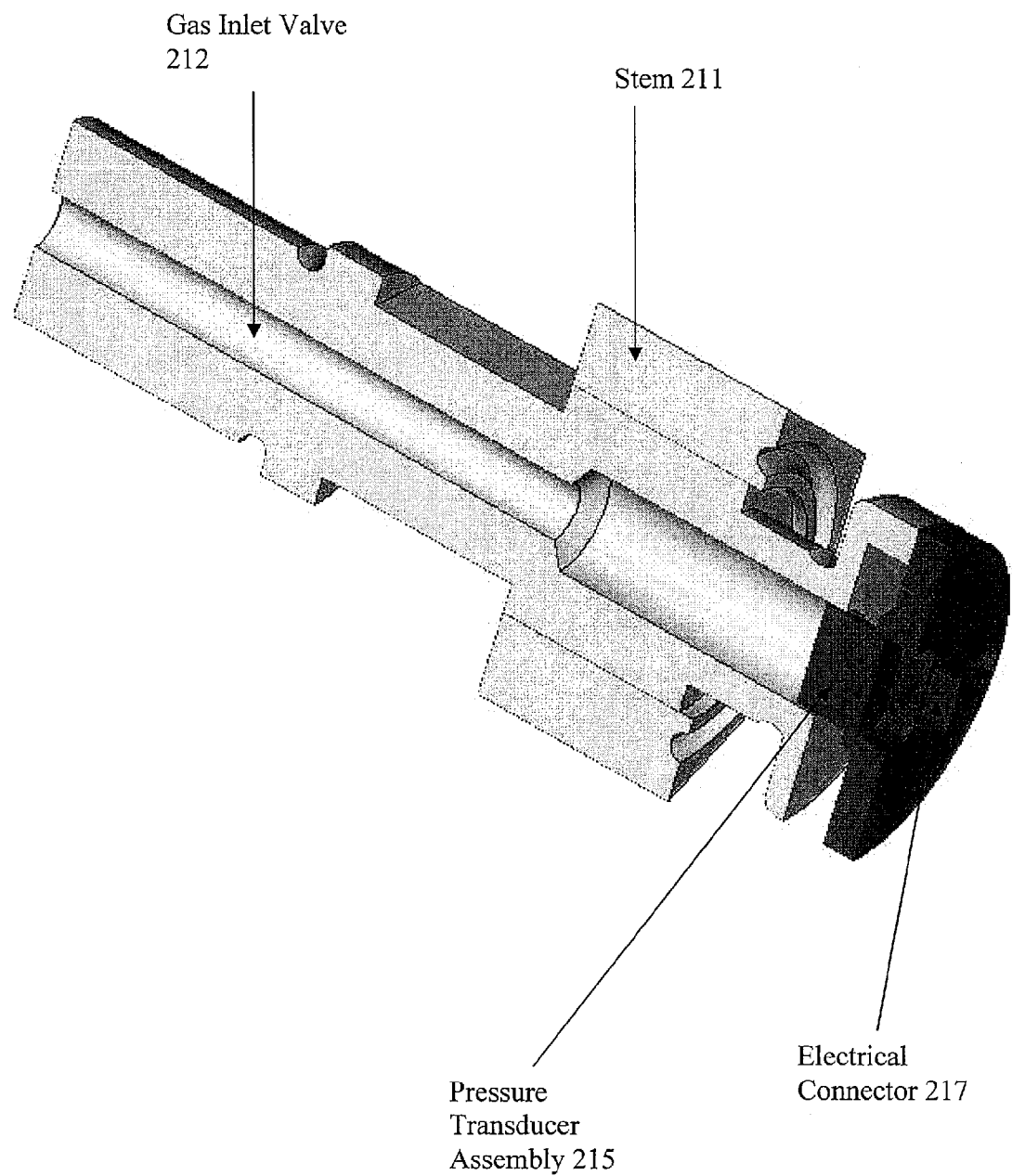
FIG. 7 shows a sectional view of an apparatus embodying features of the present invention.

As shown in FIGS. 3, 6 and 7, in some embodiments, the interface 208 comprises a solid housing 210, a stem 211 and a gas inlet valve 212. In some embodiments, the interface 208 is adapted to be removably connected to the pressure measurement outlet 206. In some embodiments, the interface 208 may be connected directly to the pressure measurement outlet 206, for example, by a threaded or quick-release connection mounted on the stem 211. In some embodiments, the interface 208 may be connected to the pressure measurement outlet 206 using hose or pipe suitable for containment of pressurized gas present in the singular sealed apparatus. In some embodiments, the input device is a keypad 214 adapted to permit entry of numerical data. In some embodiments, the indicator is a display 216 adapted to show numerical data.

In some embodiments, the present invention further provides one or more plugs having shapes and configurations suitable for filling and hermetically sealing the rebreather holes 106 found in the rebreather canister lid.

In some embodiments, the interface 208 comprises a power source 213 and a pressure transducer assembly 215, which may further comprise an electrical connector 217. In some embodiments, the interface 208 comprises a microprocessor mounted behind the display 216 and adjacent to the power source 213 and connections between the microprocessor, the electrical connector 217, the display 216 and the keypad 214 adapted for transmitting and receiving data and signals.

In some embodiments, the gas inlet valve 212 is adapted to receive a gas mixture flowing from the pressure measurement outlet 206. In some embodiments, the pressure transducer assembly 215 is adapted to measure the absolute pressure of the gas mixture flowing from the pressure measurement outlet 206 into the gas inlet valve 212 and to convert pressure measurements into electrical signals, and the electrical connector 217 is adapted to transmit the electrical signals to the microprocessor. In some embodiments, the microprocessor is adapted to receive electrical signals from the electrical connector 217, determine the absolute pressure of the gas mixture flowing from the pressure measurement outlet 206 into the gas inlet valve 212, receive input signals from the keypad 214 identifying the concentration of a selected gas in the gas mixture flowing from the pressure measurement outlet 206 into the gas inlet valve 212, calculate the partial pressure of the selected gas in the gas mixture flowing from the pressure measurement outlet 206 into the gas inlet valve 212 and transmit data to the display 216 corresponding to the absolute pressure of the gas mixture flowing from the pressure measurement outlet 206 into the gas inlet valve 212 and the partial pressure of the selected gas in the gas mixture.

A singular sealed apparatus of the present invention may be assembled by attaching the open end of the pod 200 to the rebreather canister lid 100, attaching the pressure sensor or the interface 208 to the pressure measurement outlet 206, filling any rebreather holes 106 present in the rebreather canister lid 100 with the plugs and attaching a gas supply, typically a pressurized tank, to the gas supply inlet 204 to admit a gas mixture into the singular sealed apparatus. One of ordinary skill in the art will recognize that the singular sealed apparatus thus assembled provides a closed system that is hermetically sealed.

Figure 4:
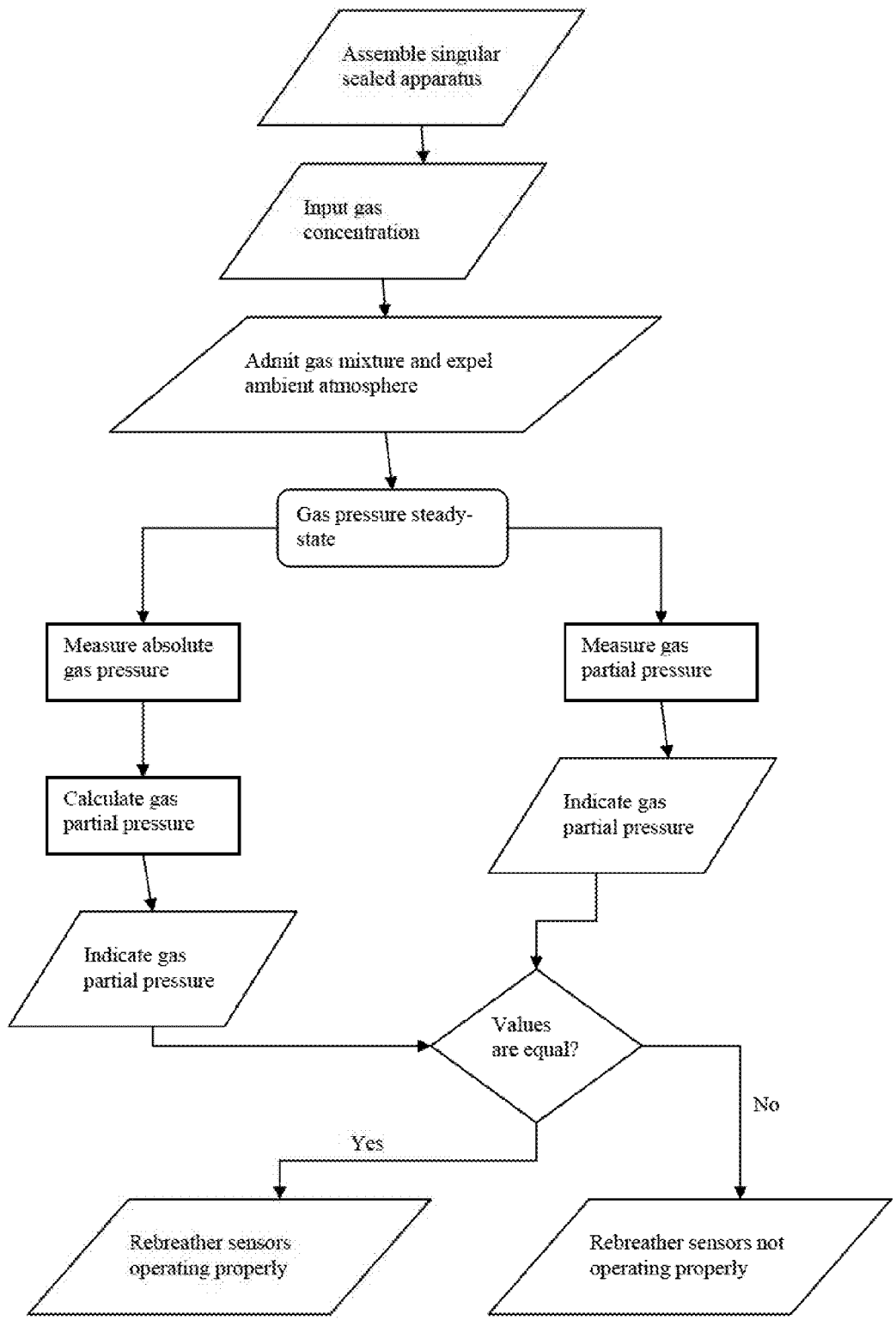
FIG. 4 shows a flowchart of a method embodying features of the present invention.

In accordance with a method provided by the present invention, as shown in FIG. 4, the user can assemble the singular sealed apparatus as described above, open the gas exit valve, input the gas concentration and admit the gas mixture from the gas supply into the singular sealed apparatus.

The initial addition of the gas mixture will expel the ambient atmosphere present in the singular sealed apparatus, and the gas exit valve may be closed once the singular sealed apparatus contains only the gas mixture.

Because the singular sealed apparatus is closed and hermetically sealed, absolute gas pressure in the singular sealed apparatus will reach steady-state.

After the gas mixture is admitted into the singular sealed apparatus, the pressure sensor measures absolute gas pressure in the singular sealed apparatus and transmits pressure measurement signals to the processor. The processor receives the absolute gas pressure measurement signals from the pressure sensor and the concentration of a selected gas in the gas mixture from the input device and then calculates the partial pressure of the selected gas in the gas mixture as a product of absolute gas pressure and the concentration of the selected gas in the gas mixture, or $PP_{gas}$=(absolute gas pressure)×(% gas concentration). The processor transmits the calculated value of the partial pressure of the gas to the indicator, and the indicator can display the absolute gas pressure and the calculated value of the partial pressure of the selected gas.

After the gas mixture is admitted into the singular sealed apparatus, the rebreather sensor 102 measures the partial pressure of the gas and transmits the measurement data to the rebreather processor 104, which transmits the measured value of the partial pressure of the gas to the rebreather indicator 108.

One of ordinary skill in the art will understand that the measured and calculated partial pressure values can be determined in any order or simultaneously.

The user can compare the calculated partial pressure value shown on the indicator with the measured partial pressure value shown on the rebreather indicator 108. The calculated partial pressure value is independent of sensor related effects and can serve as the standard for comparison. Accordingly, a discrepancy between the calculated partial pressure value and the measured partial pressure value would indicate that the rebreather sensor 102 or the rebreather processor 104 is not operating correctly.

The singular sealed apparatus of the present invention may be modified to further comprise an analyzer 105 adapted to measure and indicate partial pressure values of the selected gas received from a rebreather sensor 102, wherein the analyzer may comprise any suitable microprocessor adapted to receive data and signals corresponding to measurements of the partial pressure of a gas and an indicator adapted to display numerical data corresponding to measurements of the partial pressure of a gas. The rebreather sensor 102 can be connected to transmit signals and data to both the analyzer 105 and the rebreather processor 104. When a user assembles this embodiment of the singular sealed apparatus and admits a gas mixture from a gas supply, the interface 208 will indicate a calculated partial pressure value for the selected gas and the analyzer 105 and the rebreather indicator 108 will indicate measured partial pressure values for the selected gas.

This embodiment provides the further advantage of identifying whether either the rebreather sensor 102 or the rebreather processor 104 is not operating properly. If the measured partial pressure value indicated by the rebreather indicator 108 is different from the calculated partial pressure value and the measured partial pressure value indicated by the analyzer 105, then the rebreather processor 104 is not operating properly. If both measured partial pressure values indicated by the analyzer 105 and the rebreather indicator 108 are different from the calculated partial pressure value, then the rebreather sensor 102 is not operating properly.

Figure 5:
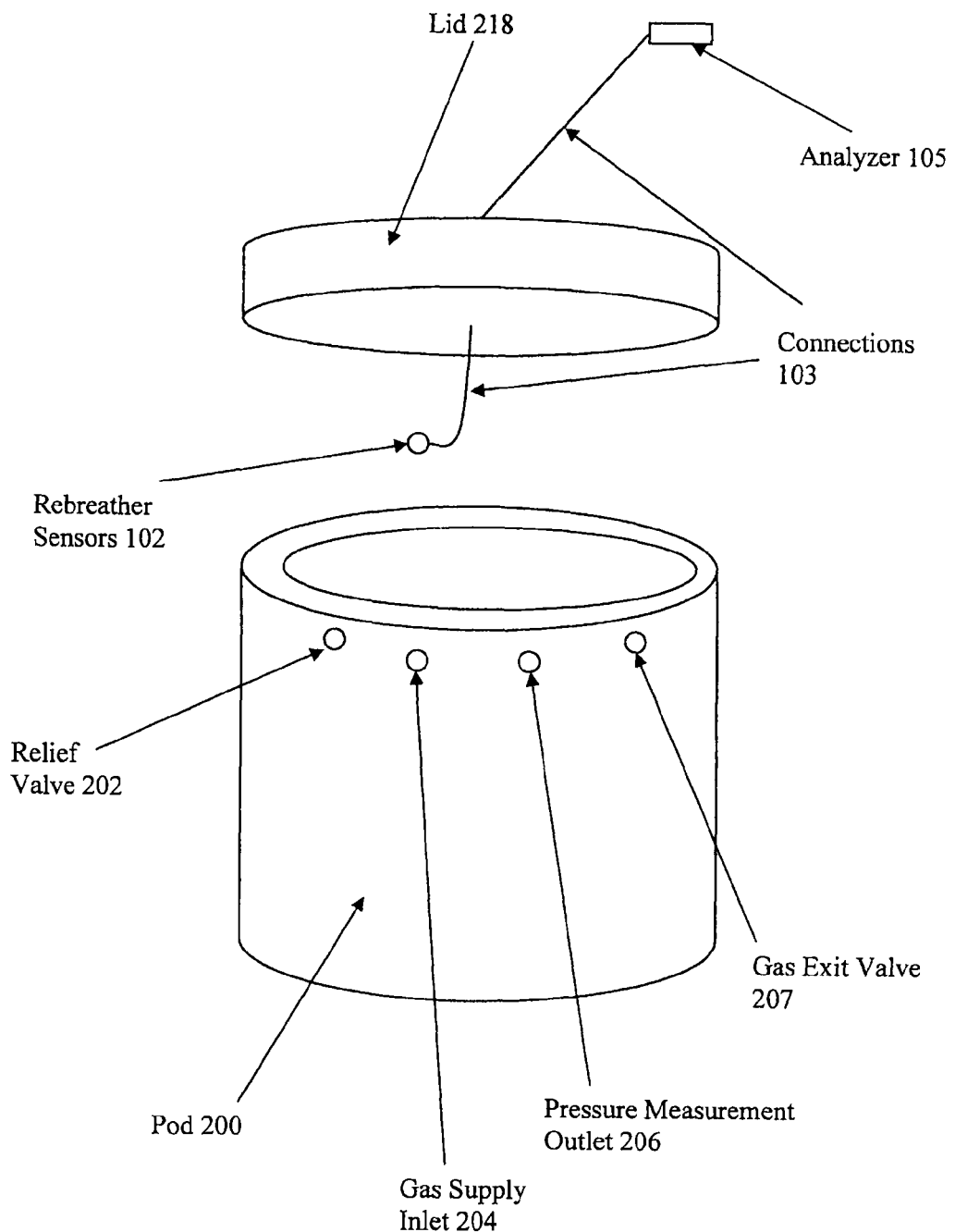
FIG. 5 shows a front perspective view of an apparatus embodying features of the present invention.

Another embodiment of the present invention is a singular sealed apparatus as shown in FIG. 5. The apparatus comprises a pod 200 and a lid 218 adapted to be removably attached to the pod 200. In some embodiments, the singular sealed apparatus comprises a relief valve 202, a gas supply inlet 204, a pressure measurement outlet 206 and a gas exit valve 207 integrated into the pod 200 and/or the lid 218. In some embodiments, the singular sealed apparatus comprises a rebreather sensor 102 disposed inside of the singular sealed apparatus and an analyzer 105 disposed outside of the singular sealed apparatus that is adapted to measure and indicate values of the partial pressure of a gas from a rebreather sensor 102, with connections 103 between the rebreather sensor 102 and the analyzer 105 for transmitting and receiving data and signals. In some embodiments, the rebreather sensor 102 and the analyzer 105 may be connected through either the pod 200 or lid 218. In some embodiments, the singular sealed apparatus further comprises an interface 208 comprising a pressure sensor, input device, processor and indicator. In some embodiments, the analyzer 105 may incorporate a liquid crystal display screen or other suitable visual indicating mechanism to display data.

A user may assemble the embodiment of the present invention shown in FIG. 5 by disconnecting the rebreather sensor 102 from a rebreather apparatus and connecting the rebreather sensor 102 to the analyzer 105 through the lid 218. In other embodiments, the rebreather sensor 102 and analyzer 105 may be connected through the pod 200. The user may then attach the lid 218 to the pod 200 and attach the interface 208 to the singular sealed apparatus. The user may then open the gas exit valve 207, input a known gas concentration, admit a gas mixture from a gas supply into the singular sealed apparatus and close the gas exit valve 207 when the ambient atmosphere present in the singular sealed apparatus has been expelled by the addition of the gas mixture. The user can then compare the calculated gas partial pressure value displayed by the interface 208 with the measured gas partial pressure value displayed by the analyzer 105.

The previously described embodiments of the present invention have many advantages, including enabling a diver to verify the accuracy of gas partial pressure measurements made by the rebreather sensor 102 and thereby to confirm the operability status of the rebreather sensor 102 and rebreather processor 104 prior to using such equipment during a dive. The invention does not require that all advantageous features be incorporated into, or all advantages provided by, every embodiment of the invention.

Although the present invention has been described in considerable detail with reference to certain embodiments thereof, other embodiments are possible. Therefore, the spirit and scope of the appended claims should not be limited to the description of the embodiments contained therein.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. An apparatus suitable for comparing gas pressure measurements in a singular sealed apparatus, the apparatus comprising:
   (a) a rebreather canister lid;
   (b) a rebreather processor;
   (c) a rebreather sensor;
   (d) a rebreather indicator;
   (e) a rebreather hole;
   (f) a pod suitable for housing a gas mixture;
   (g) a relief valve;
   (h) a gas supply inlet;
   (i) a gas pressure regulator;
   (j) a pressure measurement outlet;
   (k) a gas exit valve;
   (l) a plug;
   (m) a pressure sensor;
   (n) an input device;
   (o) a processor; and
   (p) an indicator
   wherein
   (A) the rebreather processor receives measurement signals corresponding to partial pressure of a gas present in the apparatus and transmits measurement data for partial pressure, the rebreather processor being attached to the rebreather canister lid;
   (B) the rebreather sensor produces measurement signals corresponding to partial pressure of the gas present in the apparatus and transmits the measurement signals to the rebreather processor, the rebreather sensor having a connection with the rebreather processor for transmitting signals and being attached to a surface of the rebreather canister lid that is exposed to the gas present in the apparatus;
   (C) the rebreather indicator receives and indicates to a user measurement data for partial pressure of the gas present in the apparatus, the rebreather indicator having a connection with the rebreather processor for receiving measurement data;
   (D) the rebreather hole is formed in the rebreather canister lid;
   (E) the pod is adapted to be removably attached to the rebreather canister lid;
   (F) the relief valve is integrated into the pod to limit absolute as pressure in the apparatus;
   (G) the gas supply inlet is integrated into the pod;
   (H) the gas pressure regulator is integrated into the gas supply inlet;
   (I) the pressure measurement outlet is integrated into the pod;
   (J) the gas exit valve is integrated into the pod;
   (K) the plug removably fills the rebreather hole;
   (L) the pressure sensor measures absolute gas pressure in the apparatus and transmits absolute pressure measurement signals;
   (M) the input device permits a user to input a concentration of the gas present in the apparatus and transmits data for concentration of the gas present in the apparatus;
   (N) the processor receives absolute pressure measurement signals from the pressure sensor, receives data for concentration of the gas present in the apparatus from the input device, calculates partial pressure of the gas present in the apparatus and transmits measurement data; and
   (O) the indicator receives measurement data from the processor and indicates partial pressure of the gas present in the apparatus.

2. The singular sealed apparatus suitable for comparing gas pressure measurements of claim 1, the apparatus further comprising an interface comprising the pressure sensor, input device, processor and indicator.

3. The singular sealed apparatus suitable for comparing gas pressure measurements of claim 1, the apparatus further comprising a fastener.

4. The singular sealed apparatus suitable for comparing gas pressure measurements of claim 1, the apparatus further comprising an interface comprising the pressure sensor, input device, processor and indicator, wherein the interface is removably connected to the pressure measurement outlet.

5. The singular sealed apparatus suitable for comparing gas pressure measurements of claim 1, the apparatus further comprising a fastener to removably secure the pod to the rebreather canister lid.

6. The singular sealed apparatus suitable for comparing gas pressure measurements of claim 1, the apparatus further comprising a pressure sensor removably connected to the pressure measurement outlet.

7. The singular sealed apparatus suitable for comparing gas pressure measurements of claim 1, the apparatus further comprising an analyzer connected to the rebreather sensor and receives measurement signals corresponding to partial pressure of the gas present in the apparatus and to indicate measurement data for partial pressure of the gas.

8. An apparatus suitable for comparing gas pressure measurements in a singular sealed apparatus, the apparatus comprising:
   (a) a pod;
   (b) a lid removably attached to the pod;
   (c) an analyzer to receive measurement signals corresponding to partial pressure of the gas present in the apparatus and to indicate measurement data for partial pressure of the gas;
   (d) a rebreather sensor to produce measurement signals corresponding to partial pressure of the gas present in the apparatus and to transmit the measurement signals to the analyzer, the rebreather sensor having a connection with the analyzer for transmitting signals and being attached to a surface of the rebreather canister lid that is exposed to the gas present in the apparatus;
   (e) a relief valve integrated into the pod to limit absolute gas pressure in the apparatus;
   (f) a gas supply inlet integrated into the pod;
   (g) a gas pressure regulator integrated into the gas supply inlet;
   (h) a pressure measurement outlet integrated into the pod;
   (i) a gas exit valve integrated into the pod;
   (j) a pressure sensor to measure absolute gas pressure in the apparatus and transmit absolute pressure measurement signals;
   (k) an input device to permit a user to input a concentration of the gas present in the apparatus and to transmit data for concentration of the gas present in the apparatus;
   (l) a processor to receive absolute pressure measurement signals from the pressure sensor, receive data for concentration of the gas present in the apparatus from the input device, calculate partial pressure of the gas present in the apparatus and transmit measurement data; and (m) an indicator to receive measurement data from the processor and indicate partial pressure of the gas present in the apparatus.

9. The singular sealed apparatus suitable for comparing gas pressure measurements of claim 8, the apparatus further comprising an interface comprising the pressure sensor, input device, processor and indicator, wherein the interface is removably connected to the pressure measurement outlet.

10. The singular sealed apparatus suitable for comparing gas pressure measurements of claim 8, the apparatus further comprising a pressure sensor removably connected to the pressure measurement outlet.

11. A method for performing a pre-dive safety check determining whether a rebreather processor and sensors are functioning properly, the method comprising:
    (a) assembling a singular sealed apparatus;
    (b) inputting a concentration of a gas present in a gas mixture;
    (c) admitting the gas mixture into the singular sealed apparatus;
    (d) expelling ambient gas present in the singular sealed apparatus;
    (e) measuring absolute pressure of the gas mixture and converting the absolute measurements into electrical signals;
    (f) calculating partial pressure of the gas;
    (g) displaying the calculated partial pressure of the gas;
    (h) measuring partial pressure of the gas;
    (i) displaying the measured partial pressure of the gas; and
    (j) determining whether the rebreather processor and sensors are functioning properly by comparing the calculated partial pressure of the gas to the measured partial pressure of the gas, wherein
    (A) the singular sealed apparatus comprises a rebreather canister lid removably attached to a pod and a plug filling a rebreather hole;
    (B) the concentration of the gas present in the gas mixture is input using an input device;
    (C) the gas mixture is admitted into the singular sealed apparatus using a gas supply inlet;
    (D) ambient gas present in the singular sealed apparatus is expelled using a gas exit valve;
    (E) the absolute pressure of the gas mixture is measured using a pressure sensor;
    (F) the partial pressure of the gas is calculated using a processor;
    (G) the calculated partial pressure of the gas is indicated using an indicator;
    (H) the partial pressure of the gas is measured using a rebreather sensor and rebreather processor; and
    (I) the measured partial pressure of the gas is indicated using a rebreather indicator.

12. The method for performing a pre-dive safety check of claim 11, further comprising attaching a pressure sensor to a pressure measurement outlet.

13. The method for performing a pre-dive safety check of claim 11, further comprising attaching an interface to a pressure measurement outlet.

14. The method for performing a pre-dive safety check of claim 11, further comprising attaching a pressure sensor to a pressure measurement outlet.

15. The method for performing a pre-dive safety check of claim 11, the method further comprising attaching an interface to a pressure measurement outlet.

\* \* \* \* \*